United States Patent
Luan et al.

(10) Patent No.: US 9,710,366 B2
(45) Date of Patent: Jul. 18, 2017

(54) GENERATING TEST CODE TO TEST EXECUTABLE CODE

(71) Applicant: Hewlett-Packard Development Company, L.P., Houston, TX (US)

(72) Inventors: Jin-Feng Luan, Shanghai (CN); Yi-Qun Ren, Shanghai (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 49 days.

(21) Appl. No.: 14/761,342

(22) PCT Filed: Jan. 29, 2013

(86) PCT No.: PCT/CN2013/071072
§ 371 (c)(1),
(2) Date: Jul. 16, 2015

(87) PCT Pub. No.: WO2014/117320
PCT Pub. Date: Aug. 7, 2014

(65) Prior Publication Data
US 2015/0324275 A1 Nov. 12, 2015

(51) Int. Cl.
*G06F 9/44* (2006.01)
*G06F 11/36* (2006.01)

(52) U.S. Cl.
CPC ...... *G06F 11/3684* (2013.01); *G06F 11/3692* (2013.01); *G06F 8/30* (2013.01)

(58) Field of Classification Search
CPC ..... G06F 11/3684; G06F 11/3692; G06F 8/30
See application file for complete search history.

(56) References Cited

U.S. PATENT DOCUMENTS

| | | | | |
|---|---|---|---|---|
| 5,542,043 A * | 7/1996 | Cohen | ................. | G06F 11/3684 702/108 |
| 5,943,048 A * | 8/1999 | Nyman | ................. | G06F 9/4443 714/E11.208 |
| 6,378,088 B1 * | 4/2002 | Mongan | .............. | G06F 11/3684 703/22 |
| 7,093,238 B2 * | 8/2006 | Givoni | ................ | G06F 11/3664 714/E11.208 |
| 7,844,413 B2 * | 11/2010 | Overman | .............. | G06F 11/263 702/120 |

(Continued)

FOREIGN PATENT DOCUMENTS

| | | |
|---|---|---|
| CN | 201082877 A | 12/2007 |
| CN | 102110053 A | 6/2011 |

OTHER PUBLICATIONS

IDS—NPL—Froglogic—Stress Testing—Squish Manual—2012, Located at https://doc.froglogic.com/squish/4.0/ 2012.*
Computer Encyclopedia Priority Definition, located at http://www.yourdictionary.com/priority, 2016.*
Amalfitano, D. et al., "A GUI Crawling-based technique for Android Mobile Application Testing," Software Testing, Verification and Validation Workshops (ICSTW), 2011 IEEE Fourth International Conference on, pp. 252-261.

(Continued)

*Primary Examiner* — Wei Zhen
*Assistant Examiner* — Hossain Morshed

(57) ABSTRACT

A test code is generated based on a test rule relating to testing of executable code. The test code is executed to perform a test of the executable code, where executing the test code causes performance of actions including operation of user-activatable control elements of the executable code. In response to detecting an abnormal behavior of the executable code during the test, instructions of the test code relating to the actions are saved to allow a replay of the test to identify a cause of the abnormal behavior.

15 Claims, 3 Drawing Sheets

(56) References Cited

U.S. PATENT DOCUMENTS

| | | | | |
|---|---|---|---|---|
| 8,627,295 B2* | 1/2014 | Foley | ............... | G06F 11/3684 |
| | | | | 717/127 |
| 2008/0127103 A1* | 5/2008 | Bak | ............... | G06F 11/3688 |
| | | | | 717/126 |
| 2012/0079457 A1* | 3/2012 | Makey | ............ | G06F 11/3688 |
| | | | | 717/124 |
| 2012/0089964 A1* | 4/2012 | Sawano | ........... | G06F 11/3684 |
| | | | | 717/124 |
| 2012/0266023 A1* | 10/2012 | Brown | ............ | G06F 11/3684 |
| | | | | 714/32 |
| 2013/0191812 A1* | 7/2013 | Mishra | ............ | G06F 11/3696 |
| | | | | 717/124 |

OTHER PUBLICATIONS

Froglogic, "How to Do Automatic Stress Testing on Qt," Stress Test, retrieved online Oct. 2, 2012, 4 pages, available at http://doc.froglogic.com/squish/4.0/all/ug-stresstesting.html.

Gorilla Logic, "Meet the Monkeys," 2 pages, 2012, available at http://www.gorillalogic.com/testing-tools/meet-the-monkeys.

International Search Report & Written Opinion received in PCT Application No. PCT/CN2013/071072, Nov. 7, 2013, 7 pages.

Zreda, M., "FlexMonkey—Flex Test Automation Tool Review," Apr. 7, 2009, 5 pages, available at http://www.testandtry.com/2009/04/07/flexmonkey-flex-test-automation-tool-review/.

* cited by examiner

GENERATING TEST CODE TO TEST EXECUTABLE CODE

BACKGROUND

When developing executable code such as applications, tests are run against the executable code. In some cases, the testing of the executable code can be performed manually by a human tester. One type of test that can be performed by the human tester is a monkey test, where the human tester can randomly operate controls of the executable code to determine whether the executable code exhibits some abnormality (e.g. crash of the executable code or other anomalous behavior). A monkey test can be a relatively lengthy test, especially if the monkey test is performed manually by a human tester.

BRIEF DESCRIPTION OF THE DRAWINGS

Some embodiments are described with respect to the following figures.

DETAILED DESCRIPTION

A monkey test for testing executable code includes various ad-hoc or random actions that can be performed with respect to features of an executable code that is under test. Examples of executable code include applications, operating systems, device drivers, firmware, or other machine-readable instructions. The features of the executable code that can be controlled in a monkey test can include user interface (UI) control elements that are activatable by a user (or by users). The UI control elements can be graphical user interface (GUI) control elements, or any other control elements presented by the executable code for user activation. The user-activatable control elements determine an execution sequence of the executable code.

In some examples, the UI control elements can include buttons that are clickable by users, text boxes in which users can enter text, drop-down menus in activatable by a user to cause presentation of a menu including various control items that are selectable by a user, and so forth. A drop-down menu is also referred to as a combo box. A text box is also referred to as an edit box. During a monkey test, the various UI control elements can be operated randomly or otherwise in an un-planned manner.

An issue with performing monkey tests is that the particular combination of actions associated with the monkey test that may have led to an abnormal behavior of the executable code under test may not be easily re-created to reproduce the abnormal behavior. An "abnormal behavior" of an executable code can refer to a crash of the executable code, a fault of the executable code, or any other unexpected behavior exhibited by the executable code during a test.

In accordance with some implementations, techniques or systems are provided to allow for automated generation of a test code for use by a test application in performing a monkey test of an executable code under test. The test application can save information relating to actions taken in testing the executable code under test such that a monkey test resulting in an abnormal behavior of the executable code under test can be recreated.

Figure 1:
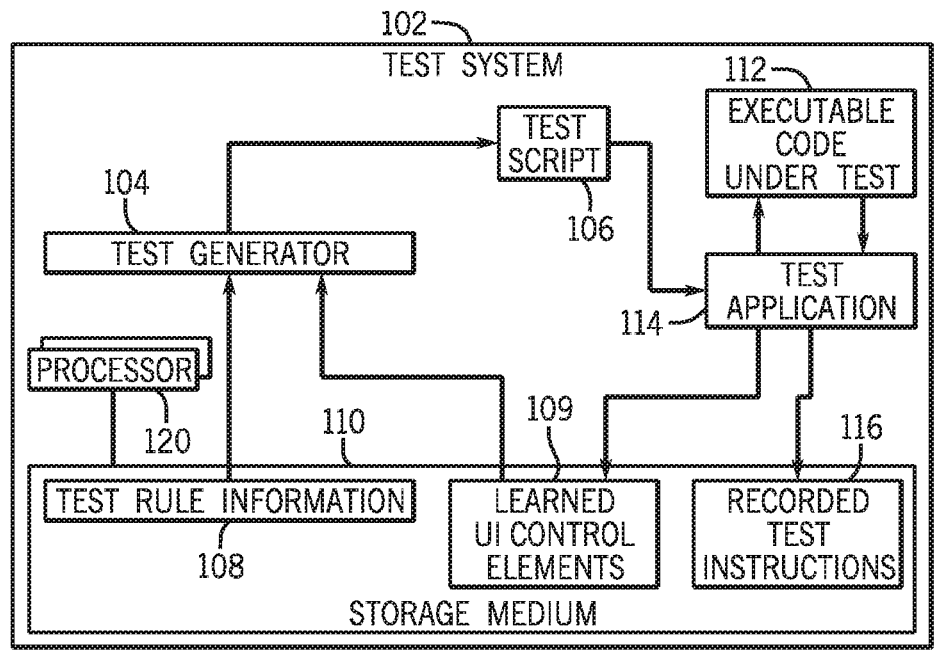
FIG. 1 is a block diagram of an example arrangement including a test system according to some implementations.

FIG. 1 is a block diagram of an example test system 102 in accordance with some implementations. The test system 102 includes a test application 114, which is able to perform a test by applying a test script 106 with respect to an executable code under test 112. The test application 114 may include an interface to the executable code under test 112 that allows the test application 114 to identify and operate the UI control elements of the executable code under test 112. The test application 114 is able to learn the UI control element of the executable code under test 112. The executable code under test 112 can include one or multiple windows, where each window can include one or multiple UI control elements that can be operated by the test application 114. Learning a UI control element by the test application 114 involves identifying the UI control element by the test application 114, where the identified UI control element may not previously have been known to a user of the test application 114. The learned UI control elements are stored as learned UI control elements 109 in a storage medium 110.

By using the test application 114 to learn the UI control elements 109 of the executable code under test 112, a user would not have to manually identify such UI control elements. A complex executable code under test 112 can include a relatively large number of windows and thus may have a relatively large number of UI control elements. Having to manually identify such a relatively large number of UI control elements can be challenging.

The ability of the test application 114 to identify UI control elements of the executable code under test 112 is also useful when there are different types of executable code to test.

The test system 102 further includes a test generator 104, which is able to generate the test script 106 (or other type of test code) based on test rule information 108 and the learned UI control elements 109 stored in the storage medium 110. A test code, such as a test script, can refer to a collection of machine-readable program instructions that are executed to perform a target test. The test script 106 is provided as an input to the test application 114. Although the test application 114 and test generator 104 are depicted as being separate in FIG. 1, it is noted that the test generator 104 can be part of the test application 114 in other examples. In other examples, test rule information 108 is not used in generating the test script 106. Rather, based on the learned UI control elements, the test generator 104 can generate a test script that includes random actions to be performed in the monkey test.

The test rule information 108 specifies the actions that are to be performed in the monkey test executed by the test script 106. The test rule information 108 can include one or multiple test rules. Each test rule can specify a specific action or type of action that is to be taken, and the corresponding relative frequency of operation (which can be expressed as a percentage or as another value). For example, a first test rule can specify that a first action is to be performed with 90% probability, and a second rule can specify that a second action is to be performed with 70% probability. The first action can involve a first task or some combination of tasks to be performed with respect to one or multiple UI control elements. Similarly, the second test rule can specify a task or some combination of tasks to be performed with respect to another one or multiple UI control elements.

As UI control elements are learned by the test application 114, the test rule information 108 can be modified, such as by adding more test rules for additionally identified UI control elements, or modifying existing test rules to account for the additionally identified UI control elements.

In accordance with some implementations, to enhance user convenience, the test rule(s) in the test rule information 108 can be expressed in a non-program format. In other words, each test rule is not expressed in a program code, such as a block of program instructions. The test rules of the test rule information 108 can be in the form of a list of parameters and respective assigned values, where the parameters and respective assigned values can indicate corresponding actions to be performed with respect to the UI control elements of the executable code under test. For example, the test rules can be in a spreadsheet (e.g. EXCEL® spreadsheet, etc.) or in a file according to another format.

Specifying the test rules of the test rule information 108 in a non-program format makes it easier on a human tester to specify the test rules. Otherwise, the human tester would have to be familiar with a programming language to create the test rules, which would involve extra training to become familiar with the programming language.

The test application 114 uses the test script 106 to run a monkey test with respect to the executable code under test 112. The test script 106 specifies tasks of the monkey test that include activation of UI control elements of the executable code under test 112 in a random or ad-hoc manner.

The executable code under test 112 can provide an output, which can be monitored by the test application 114 to determine whether the executable code under test 112 is exhibiting expected or abnormal behavior.

In response to detecting abnormal behavior, the test application 114 can record test instructions (such as instructions of the test script 106) that relate to actions of the monkey test that caused the abnormal behavior. The recorded test instructions can be stored in a persistent file 116 in the storage medium 110. The recorded test instructions can include a subset (less than all) or all of the instructions in the test script 106. The recorded test instructions can be used later to replay a monkey test that caused the abnormal behavior of the executable code under test 112.

In some examples, the test script 106 that is created by the test generator 104 can be in a temporary file. If the monkey test performed based on the test script 106 produces an expected behavior of the executable code under test 112, then the temporary file including the test script 106 can be discarded. However, if the monkey test performed based on the test script 106 produces an abnormal behavior of the executable code under test 112, then the test script 106 (or a portion thereof) can be copied to a persistent file (e.g. 116) for later access to replay the monkey test (or a portion of the monkey test).

The test generator 104, test script 106, executable code under test 112, and test application 114 can be machine-readable instructions executable on one or multiple processors 120. The processor(s) 120 can be coupled to the storage medium 110.

The test system 102 can include one computer or multiple computers. In some cases, the test script 106 can be generated in a first computer, and sent to a second computer to test an executable code under test.

Figure 2:
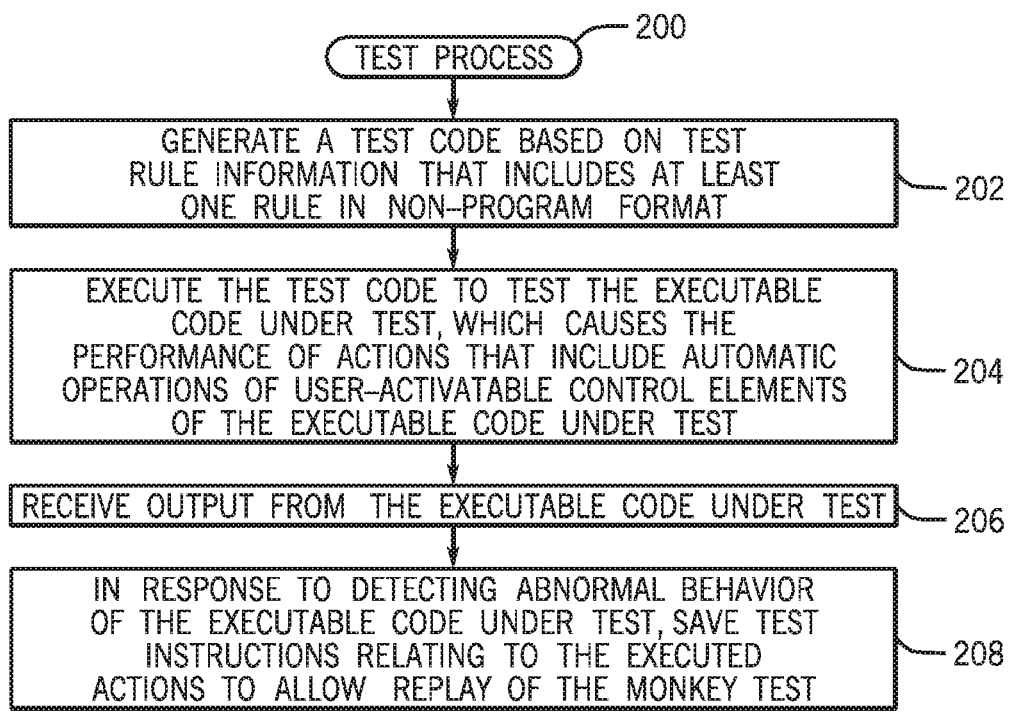
FIGS. 2 and 3 are flow diagrams of test processes according to various implementations.

FIG. 2 is a flow diagram of a test process 200 according to some implementations, which can be performed by various modules in the test system 102, including the test generator 104 and test application 114. The test process 200 generates (at 202) a test code (which can be the test script 106 or some other machine-readable instructions for performing monkey testing) based on the test rule information 108, which includes at least one rule (in non-program format) relating to the testing of the executable code under test 112. The generation of the test code is also based on learned UI control elements (109 in FIG. 1) as identified by the test application 114.

The test application 114 next executes (at 204) the test code to test the executable code under test 112. Executing the test code causes the performance of actions that include automatic operation of user-activatable control elements of the executable code under test 112. The test process 200 then receives (at 206), during the monkey test, output from the executable code under test 112 during the test. The output can indicate that the executable code under test 112 is either behaving as expected or is exhibiting an abnormal behavior.

In response to detecting an abnormal behavior of the executable code under test 112 during the test, the test process 200 saves (at 208) test instructions relating to the executed actions to allow replay of the monkey test to identify a cause of the abnormal behavior.

Figure 3:
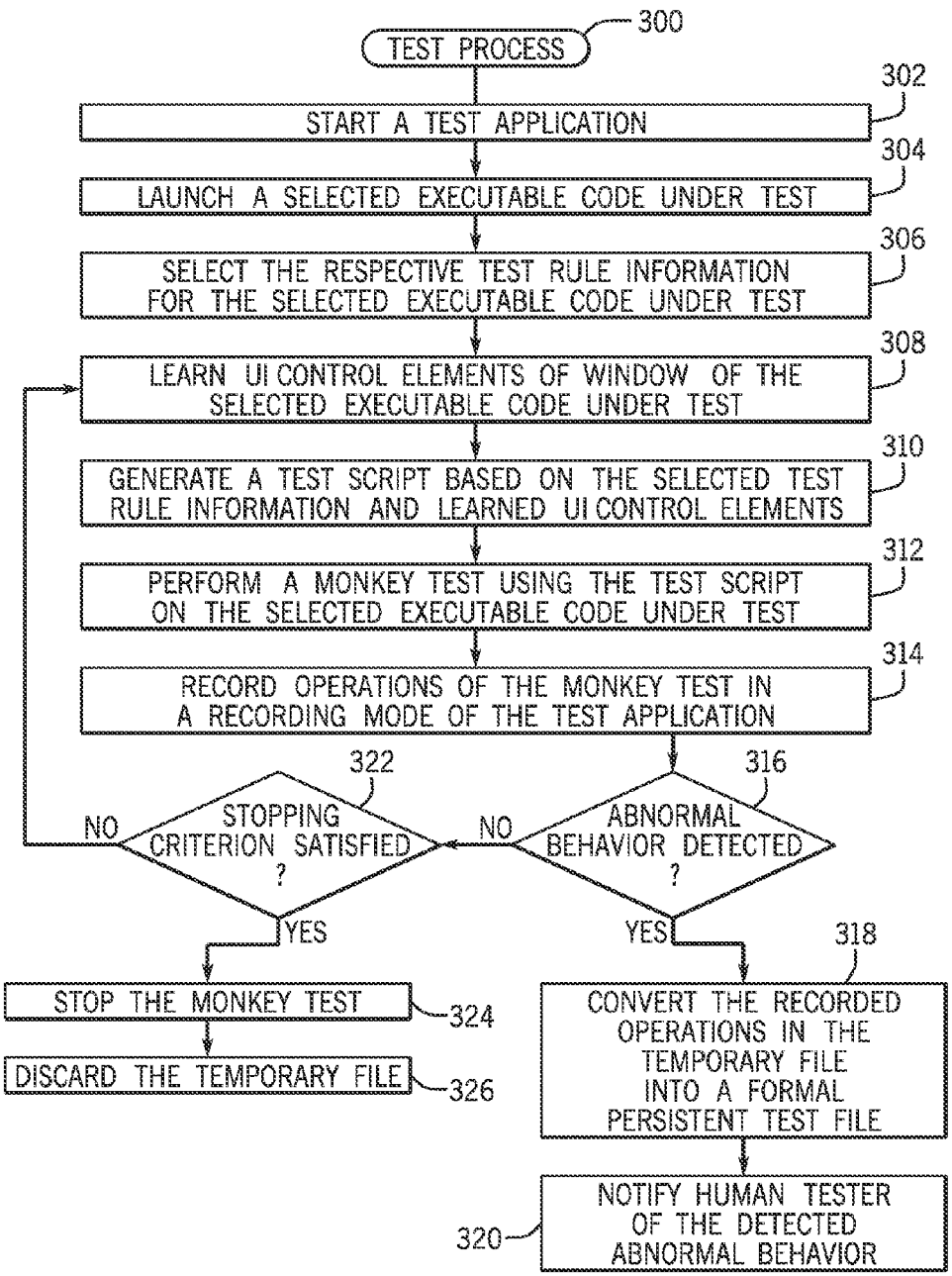

FIG. 3 is a flow diagram of a test process 300 according to further implementations for performing a monkey test on an executable code under test. The test process 300 can also be performed by the various modules of the test system 102 of FIG. 1.

The test process 300 starts (at 302) the test application 114 (FIG. 1). The test application 114 can present a user with a list of different executable code for testing. From the list, the user can select an executable code to test.

Once the executable code under test is selected, the test application 114 launches (at 304) the selected executable under test. The test process 300 can select (at 306) the respective test rule information (for the application under test). Note that there can be different test rule information for different executable code under test.

The test application 114 also learns (at 308) the UI control elements of a window (or windows) of the selected executable code under test. Note that the learning process can be a continual process that is performed during the monkey test of the selected executable code under test. As new windows are opened during the monkey test, the test application 114 can learn the UI control elements of the new windows.

The test generator 104 then generates (at 310) a test script based on the selected test rule information and the learned UI control elements. The test script is used by the test application 114 to perform (at 312) a monkey test of the selected executable code under test. The various random operations of the monkey test can be stored (at 314) into a temporary file. For example, the instructions of the test script can be recorded into the temporary file.

In response to detecting (at 316) an abnormal behavior of the executable code under test during the monkey test, the test application 114 converts (at 318) the recorded operations in the temporary file into a formal persistent test file. The test application 114 then notifies (at 320) a human tester (e.g. quality assurance engineer or other person) of the detected abnormal behavior. The notification can include an identification of the formal persistent test file (such as a pathname or uniform resource locator (URL) of the formal persistent test file). The human tester can then use the formal persistent test file to replay the monkey test to allow the human tester to identify a cause of the detected abnormal behavior.

If no abnormal behavior is detected (at 316), then the test process 300 determines (at 322) if a stopping criterion has been satisfied. A stopping criterion can specify that the monkey test is to perform a specified number (e.g. 500, 1000, 5000, etc.) of steps. Alternatively, the stopping criterion can specify that the monkey test is to be performed for a specified amount of time. If the stopping criterion is satisfied (e.g. the specified number of steps has been performed or the specified amount of time has passed), then the test application 114 stops (at 324) the monkey test, and discards (at 326) the temporary file.

However, if the stopping criterion has not been satisfied, as determined at 322, then the test process 300 continues, by proceeding to task 308. If a new window of the selected executable code under test is opened, then the UI control elements of the new window are identified (at 308), and a further test script can be generated (at 310) for use in further steps of the monkey test.

Figure 4:
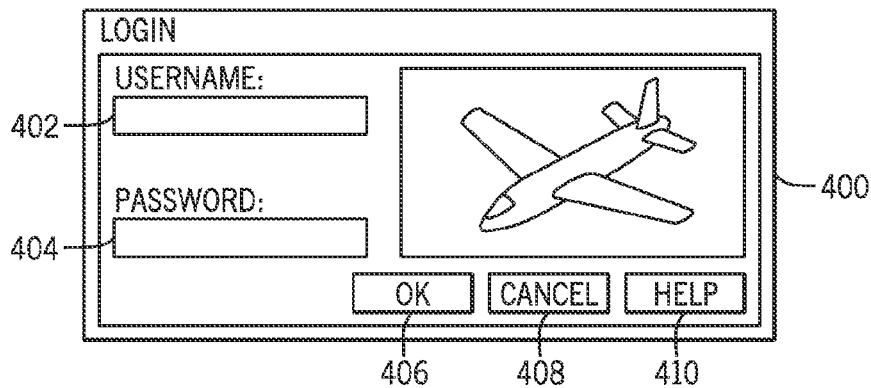
FIG. 4 is a schematic diagram of an example user interface (UI) screen having control elements that can be activated by a monkey test according to some implementations.

FIG. 4 is a schematic diagram of an example UI screen 400 that has various UI control elements of an executable code under test, including a Username text box 402 (in which a user name can be entered), a Password text box 404 (in which a password can be entered), an OK button 406, a Cancel button 408, and a Help button 410. The UI screen 400 can be a Login UI screen in which a user can log into the executable code under test. In other examples, other example UI screens can be used.

The following is an example of a test rule, according to some implementations, which can be used to generate a script. The rule set forth below specifies both probabilities and priorities associated with different types of control elements:

| Probability | Priority | UI Control Element Type |
| --- | --- | --- |
| 40% | 1 | Button, and button text in [OK, Submit, "*Add to Cart*", . . .] |
| 60% | 9 | TextBox |
| 60% | 8 | Combobox |
| 60% | 8 | SpinBox |
| 60% | 8 | RadioButton |
| 30% | 1 | Button, and button text in [Cancel, Help, . . .] |

In the foregoing example, a higher priority number indicates a higher priority. In the example given above, the priority of "9" is the highest priority.

The first column of the foregoing table specifies the implementation probability for the respective UI Control Element Type. The second column specifies the corresponding priority. The third column identifies the UI Control Element Type.

The first row of the foregoing table relates to a first group of buttons, including an OK button, a Submit button, an "Add to Cart" button, among other buttons. The last row of the foregoing table relates to a second group of buttons, including the Cancel button, Help button, and so forth. The implementation probability in the first row is different from the implementation probability in the last row for the different groups of buttons. The other rows of the foregoing table relate to other types of control elements.

Figure 5:
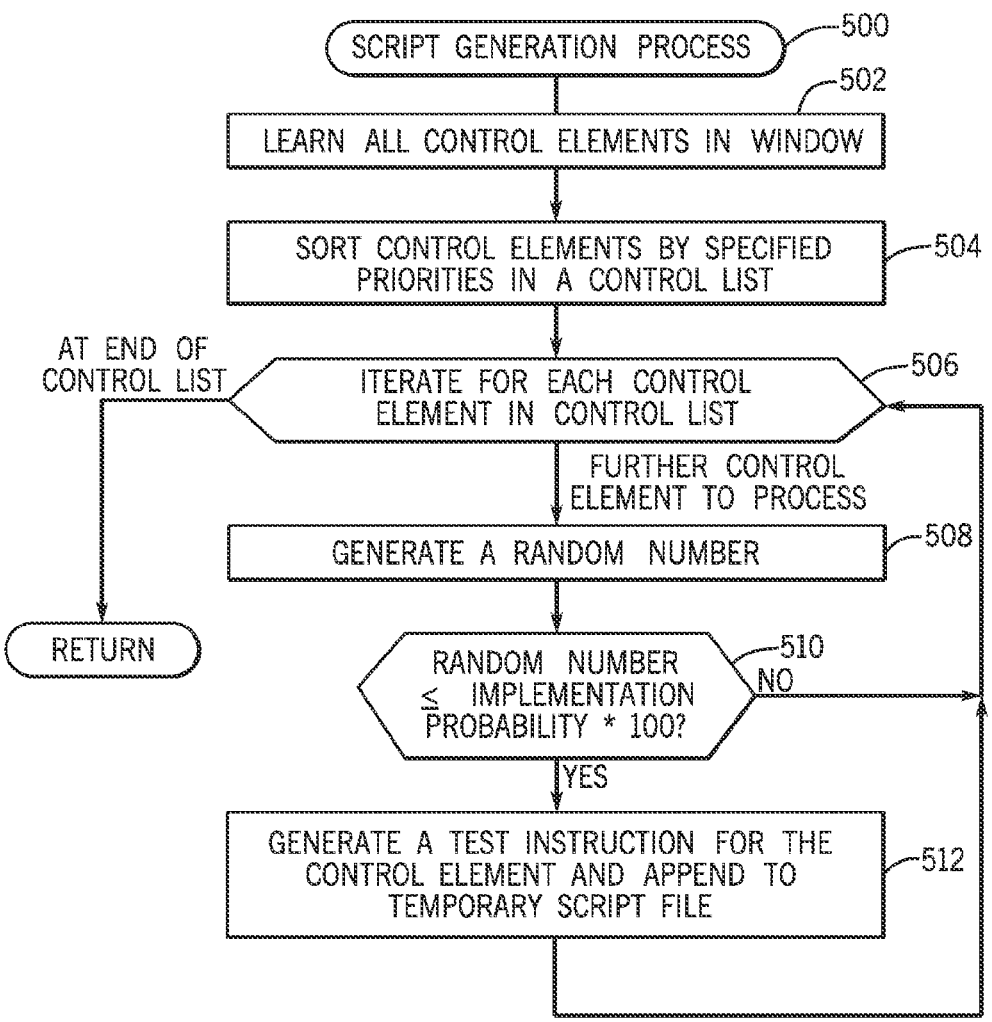
FIG. 5 is a flow diagram of a script generation process, according to further implementations.

FIG. 5 depicts an example script generation process 500 for generating a test script for a specific window, such as the window of a web page or other type of window. The FIG. 5 flow can be repeated for each window of an executable code under test 112 encountered. The script generation process 500 can be performed by the test generator 104 and the test application 114, for example.

The script generation process 500 learns (at 502) all of the control elements in the respective window. The learned control elements are then sorted (at 504) according to the specified priorities of the control elements, such as the priorities listed in the rule set forth above. The sorted control elements are provided in a control list. The sorting can be in descending order, for example.

The script generation process 500 then iterates (at 506) through each control element in the control list, in an order of the sorting. As long as there is a further control element in the control list to process, the script generation process 500 generates (at 508) a random number, by using a random number generator. In some examples, the random number can be a number between zero and 100. The script generation process 500 then determines (at 510) whether the generated random number is less than or equal to the implementation probability (multiplied by 100) that corresponds to the current control element that is being processed. If so, a respective test instruction is generated (at 512) for the current control element, and added to a temporary script file (which corresponds to the test script that is being generated by the script generation process 500).

However, if the random number is not less than or equal to the implementation probability (multiplied by 100), then a test instruction is not generated.

The script generation process 500 then returns to task 506 to iterate to the next control element in the control list. If the end of the control list is reached, the script generation process 500 returns. The output of the script generation process 500 is the temporary script file (including various test instructions generated at 512 for respective control elements) that provides the test script 106 that can be executed to perform a monkey test according to some implementations.

In some implementations, a human tester can specify which of multiple abnormal statuses are to be monitored for, and can specify respective different actions to take to handle the corresponding abnormal statuses. For example, a first abnormal status can be a crash of the executable code under test. The action specified to handle such a crash can be to stop the monkey test, and to collect useful information in a dump file. Another abnormal status can be an error message generated by the executable code under test. To handle this latter abnormal status, a recovery operation can be run and the error can be ignored following successful performance of the recovery operation.

A more specific example of an abnormal status rule is provided below in the table below:

| Target | Property | Value | Comment |
| --- | --- | --- | --- |
| Process | PID | Disappeared | Executable Code Under Test Process terminated |
| Popup window | title ContainText | "<ProcessName>" "<ProcessName> has stopped working" | Executable Code Under Test Process exception |
| Popup window | title | "Unexpected Error" | An abnormal case of Executable Code Under Test |
| Web browser | title | "Web browser cannot display the webpage*" | The URL to open is not available |

The abnormal status rule in the table above specifies four abnormal cases. The four columns of the table containing the abnormal status rule includes a Target column (which identifies the element of the executable code under test 112). In addition, the second column identifies a property of the target element, the third column specifies a value of the property, and the fourth column includes a comment explaining the respective abnormal status. In the first row, the target is a process (which is a process of the executable code under test 112). When a test instruction in the test script 106 is executed, the test application 114 can check the abnormal case rule to determine whether an abnormal status is present. For example, the test application 114 may check whether the PID of the process of the executable code under test 112 has disappeared (i.e. has the value of "Disappeared"), which is an indication that the process of the executable code under test has terminated.

As another example, the test application 114 can determine whether a title of a popup window (which has popped up due to execution of the executable code under test 112) is the text "<Process Name>" and the content of the popup window contains the text "<Process Name> has stopped working" (which correspond to the second row of the table containing the abnormal case rule). The foregoing match indicates that a process exception has occurred.

As another example, the test application 114 can determine whether a title of a popup window (which has popped up due to execution of the executable code under test 112) is the text "Unexpected Error" (which correspond to the third row of the table containing the abnormal case rule). The foregoing match indicates that an abnormal case has occurred.

The fourth abnormal case (corresponding to the last row of the table containing the abnormal status rule) relates to a web browser not being able to display a webpage, such as due to a uniform resource locator (URL) not being available.

Various modules, such as 104, 106, 112, and 114 of FIG. 1 can be loaded for execution on one or multiple processors (such as 120 in FIG. 1). A processor can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
generating, by a system having a processor, a test code based on at least one test rule relating to testing of executable code, the at least one test rule being in a non-program format, wherein the at least one test rule specifies implementation probabilities assigned to respective user-activatable control elements of the executable code, and wherein generating the test code comprises:
for a particular one of the user-activatable control elements, generating a random number;
comparing the random number to a number derived from the respective implementation probability; and
deciding whether or not to generate a test instruction for the particular user-activatable control element to include in the test code based on the comparing;
executing the test code to perform a test of the executable code, wherein executing the test code causes performance of actions including automatic operation of the respective user-activatable control elements of the executable code; and
in response to detecting an abnormal behavior of the executable code during the test, saving instructions of the test code relating to the actions to allow a replay of the test to identify a cause of the abnormal behavior.

2. The method of claim 1, further comprising:
learning, by a test application, the user-activatable control elements,
wherein generating the test code is further based on the learning of the user-activatable control elements.

3. The method of claim 2, further comprising:
opening a new window of the executable code during the test;
learning, by the test application, at least one user-activatable control element of the new window;
generating a further test code based on the at least one user-activatable control element of the new window; and
executing the further test code to perform further actions of the test.

4. The method of claim 1, wherein saving the instructions comprises saving the instructions into a persistent file, the method further comprising:
in response to detecting that the executable code does not exhibit the abnormal behavior during the test, discarding the test code.

5. The method of claim 1, wherein the at least one test rule further specifies priorities assigned to the respective user-activatable control elements.

6. The method of claim 5, wherein generating the test code uses the priorities and the implementation probabilities.

7. The method of claim 6, wherein generating the test code comprises:
sorting the user-activatable control elements by the respective priorities; and
generating test instructions for the user-activatable control elements in an order of the sorting.

8. A test system comprising:
a storage medium to store at least one test rule;
at least one processor; and a test application executable on the at least one processor to:
  learn user-activatable control elements of an executable code to be tested;
  auto-generate a test code from the at least one test rule and the learned user-activatable control elements, the test code containing program instructions to test the executable code, the at least one test rule including implementation probabilities assigned to the respective user-activatable control elements, wherein the auto-generation of the test code comprises:
    for a particular one of the user-activatable control elements, generating a random number;
    comparing the random number to a number derived from the respective implementation probability; and
    deciding whether or not to generate a test instruction for the particular user-activatable control element to include in the test code based on the comparing;
  execute the test code to cause automatic ad-hoc operation of the user-activatable control elements of the executable code in a monkey test; and
  in response to detecting an abnormal behavior of the executable code in the monkey test, save instructions from the test code into a persistent file to allow replay of the monkey test to identify a cause of the abnormal behavior.

9. The test system of claim 8, wherein the at least one test rule further includes priorities assigned to the respective user-activatable control elements.

10. The test system of claim 9, wherein the auto-generation of the test code further comprises:
  sorting the user-activatable control elements by the respective priorities; and
  generating test instructions for the user-activatable control elements in an order of the sorting.

11. The test system of claim 8, wherein the auto-generation of the test code comprises:
  generating the test instruction for the particular user-activatable control element in response to determining that the random number is less than the number derived from the respective implementation probability; and
  deciding not to generate the test instruction in response to determining that the random number is greater than the derived number.

12. An article comprising at least one non-transitory machine-readable storage medium storing instructions that upon execution cause a system having a processor to:
  learn, by a test application, user-activatable control elements of an executable code to be tested;
  generate a test code based on the learned user-activatable control elements and at least one test rule relating to testing of executable code, the at least one test rule including implementation probabilities assigned to the respective user-activatable control elements, wherein generating the test code comprises:
    for a particular one of the user-activatable control elements, generating a random number;
    comparing the random number to a number derived from the respective implementation probability; and
    deciding whether or not to generate a test instruction for the particular user-activatable control element to include in the test code based on the comparing;
  execute the test code to perform a test of the executable code, wherein executing the test code causes performance of actions including automatic operation of user-activatable control elements of the executable code;
  until a stopping criterion is satisfied, further learn additional user-activatable control elements of the executable code, and re-iterate the generating and executing to perform additional tasks of the test; and
  in response to detecting an abnormal behavior of the executable code during the test, save instructions of the test code to allow a replay of the test to identify a cause of the abnormal behavior.

13. The article of claim 12, wherein the at least one test rule further includes priorities assigned to the respective user-activatable control elements.

14. The article of claim 13, wherein generating the test code further comprises:
  sorting the user-activatable control elements by the respective priorities; and
  generating test instructions for the user-activatable control elements in an order of the sorting.

15. The article of claim 12, wherein generating the test code comprises:
  generating the test instruction for the particular user-activatable control element in response to determining that the random number is less than the number derived from the respective implementation probability; and
  deciding not to generate the test instruction in response to determining that the random number is greater than the number derived from the respective implementation probability.

* * * * *